US006496531B1

(12) United States Patent
Kamel et al.

(10) Patent No.: US 6,496,531 B1
(45) Date of Patent: Dec. 17, 2002

(54) METHOD AND SYSTEM FOR CONTROLLING FORWARD TRANSMIT POWER IN A WIRELESS SYSTEM

(75) Inventors: Raafat Edward Kamel, Westfield, NJ (US); Wen-Yi Kuo, Morganville, NJ (US); Martin Howard Meyers, Montclair, NJ (US); Carl Francis Weaver, Hanover Township, NJ (US); Xiao Cheng Wu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/389,080

(22) Filed: Sep. 2, 1999

(51) Int. Cl.[7] .............................................. H04B 1/713
(52) U.S. Cl. ........................ 375/130; 455/442; 455/450
(58) Field of Search ................................. 375/220, 222, 375/130, 219; 455/69, 450, 452, 442, 522; 370/331, 332

(56) References Cited

U.S. PATENT DOCUMENTS 6,122,334 A * 9/2000 Hughes ....................... 375/350
6,154,659 A * 11/2000 Jalali et al. .................. 455/522
6,216,004 B1 * 4/2001 Tiedemann, Jr. et al. ... 455/442
6,236,365 B1 * 5/2001 LeBlanc et al. ............. 342/457
6,351,460 B1 * 2/2002 Tiedemann, Jr. et al. ... 370/332
6,353,602 B1 * 3/2002 Cheng et al. ................ 370/332

* cited by examiner

Primary Examiner—Chi Pham
Assistant Examiner—Emmanuel Bayard
(74) Attorney, Agent, or Firm—Harness, Dickey & Pierce, P.L.C.

(57) ABSTRACT

A method and system for controlling down link transmit power during a soft hand-off in a spread-spectrum wireless system supports independent power control of multiple forward channels to reduce fading. For a soft hand-off, a mobile switching center determines if a forward control channel is transmitted from different sectors of base stations than a forward data channel is. The base stations preferably adjust transmit powers of the forward channels grouped into different physical channels by receiving power control data over the allocated reverse power control channels to compensate for fading of the forward channels during a soft hand-off.

32 Claims, 5 Drawing Sheets

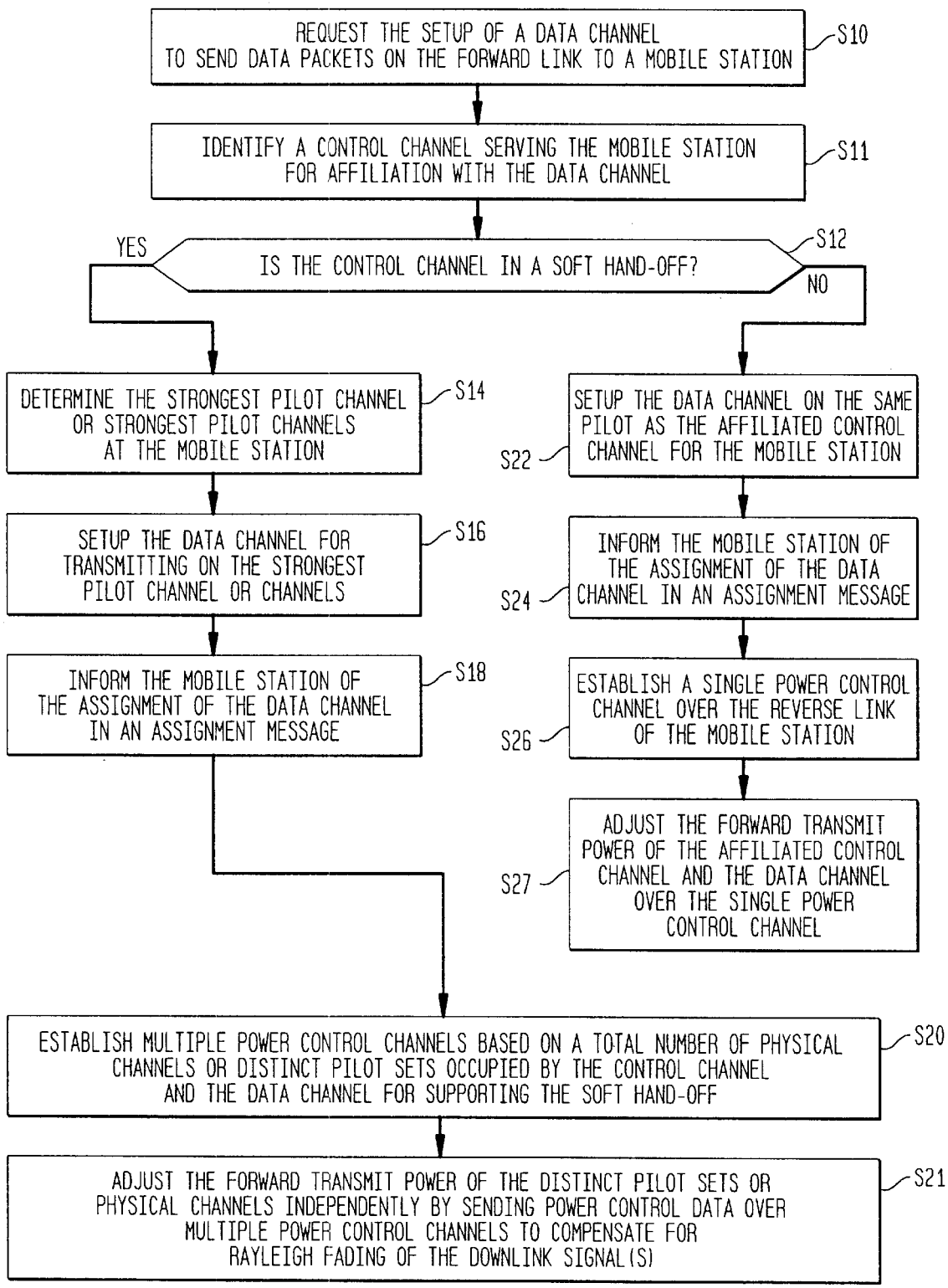

FIG. 3A

| FORWARD PILOT DESIGNATOR OR SOURCE SECTOR DESIGNATOR | FORWARD CHANNELS ASSOCIATED WITH PILOT | DESIGNATOR OF REVERSE POWER CONTROL CHANNEL |
|---|---|---|
| A | CONTROL, DATA | 1,2 (RESPECTIVELY) |
| B | CONTROL | 1 |

FIG. 3B

| FORWARD PILOT DESIGNATOR OR SOURCE SECTOR DESIGNATOR | FORWARD CHANNELS ASSOCIATED WITH PILOT | DESIGNATOR OF REVERSE POWER CONTROL CHANNEL |
|---|---|---|
| A | CONTROL, DATA | 1 |
| B | CONTROL, DATA | 1 |

FIG. 3C

| FORWARD PILOT DESIGNATOR OR SOURCE SECTOR DESIGNATOR | FORWARD CHANNELS ASSOCIATED WITH PILOT | DESIGNATOR OF REVERSE POWER CONTROL CHANNEL |
|---|---|---|
| A | CONTROL, DATA | 1,2 (RESPECTIVELY) |
| B | CONTROL, DATA | 1,2 (RESPECTIVELY) |
| C | CONTROL | 1 |

FIG. 3D

| FORWARD PILOT DESIGNATOR OR SOURCE SECTOR DESIGNATOR | FORWARD CHANNELS ASSOCIATED WITH PILOT | DESIGNATOR OF REVERSE POWER CONTROL CHANNEL |
|---|---|---|
| A | CONTROL, DATA | 1,2 (RESPECTIVELY) |
| B | CONTROL | 1 |
| C | CONTROL | 1 |

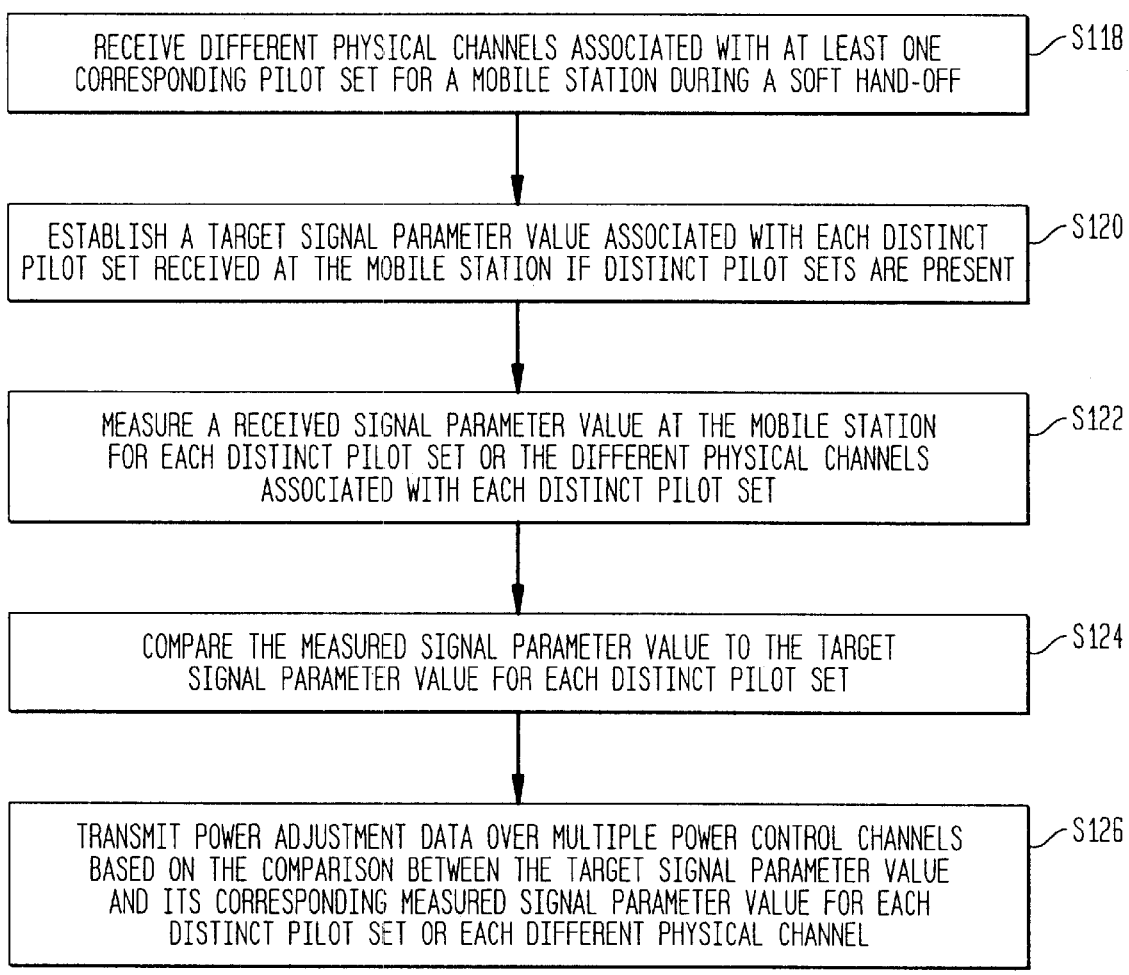

METHOD AND SYSTEM FOR CONTROLLING FORWARD TRANSMIT POWER IN A WIRELESS SYSTEM

FIELD OF THE INVENTION

This invention relates generally to a method and a system for controlling forward transmit power in a spread-spectrum communications system, such as a code-division multiple-access (CDMA) system.

BACKGROUND

In a wireless communication systems, a mobile station may receive multiple forward channels, including a voice channel, a control channel, and a data channel. Forward channels are down link channels that are transmitted from a base station to the mobile station. The voice and data channels carry subscriber traffic, while the control channel sends data used to control the operation of the mobile station.

During a soft hand-off of the mobile station from one coverage area (e.g., sector) to another, the mobile switching center may authorize base stations to simulcast forward voice, control, and data channels over co-frequency carriers. Simulcasting refers to base stations that simultaneously transmit substantially the same information over multiple forward signals. Multiple base stations, which serve the geographic location of the mobile station, may transmit identical information on the forward voice and data channels to the mobile station. At the mobile station, the rake receiver combines the simulcasted channels to realize diversity gain, where possible.

However, the service provider may not have sufficient base-station resources to provide duplicate voice channels, control channels, and data channels for each base station participating in the soft hand-off. Further, the service provider may not have sufficient interconnect capacity, such as E1 or T1 lines, between base-station sites to handle duplicate voice channels for the soft hand-off. Even if the wireless system infrastructure has adequate channel capacity to completely support soft hand-offs, reducing the number of simulcasted channels participating in the soft hand-off can reduce interference and improve traffic capacity.

Accordingly, to achieve traffic capacity and interference reduction goals in a spread-spectrum wireless system, the wireless service provider may configure a soft hand-off to use what is commonly referred to as a reduced active set. In a reduced active set, the control, voice and data channels are not simulcasted from each base station participating in the soft hand-off. Instead, the data channels may be scaled back to transmit from as few as one base station. In practice, the voice and control channel for a mobile station are often multiplexed onto one Walsh coded channel of CDMA carrier, so the advantage of reducing the participation of voice and control channels is not as great as reducing the number of independent data channels participating in the soft hand-off.

The reduced active set has other implications besides interference reduction or traffic capacity enhancement. Because the control channel and the data channel are transmitted on a different number of forward carrier legs, the control channel and the data channel may experience differential Rayleigh fading. Accordingly, forward power control data can not be applied uniformly across the communications channels without a degradation in fading tolerance. Compensating for Rayleigh fading by changing down link transmit power is further complicated by the need for sufficiently real-time response from the mobile station to the base station. Thus, a need exists to facilitate sufficiently rapid, independent power control of the forward link transmit power of the simulcasted voice, control, and data channels of participating base stations in a soft hand-off to adequately compensate for Rayleigh fading.

SUMMARY OF THE INVENTION

In accordance with one aspect of the invention, a method and system for controlling down link transmit power during a soft hand-off in a spread-spectrum wireless system supports independent power control of multiple forward channels to reduce fading. For a soft hand-off, a wireless system or a part thereof determines if a forward control channel is transmitted from different set of sectors of base stations than a forward data channel. For example, the mobile switching center determines if active control sectors are different in number or identity from at least one active data sector participating in the soft hand-off. Each sector is preferably represented by a distingishable pilot code of a pilot channel. If the forward control channel is transmitted from different sectors than the forward data channel, multiple reverse power control channels are allocated. The base stations adjust transmit powers of the forward channels grouped into different physical channels by receiving power control data over the allocated reverse power control channels to compensate for fading of the forward channels during a soft hand-off. In one embodiment of the invention, a distinct power control channel is associated with each forward data channel that is transmitted from a different set of sectors than any other channels associated the base stations participating in the soft hand-off.

BRIEF DESCRIPTION OF THE DRAWINGS

FIG. 2 is a flow chart of a method for controlling power of forward channels during the setup of a data channel in accordance with a preferred embodiment of the invention.

FIG. 3A through FIG. 3D are charts of various assignments of forward communication channels associated with corresponding reverse power control channels in accordance with a preferred embodiment of the invention.

FIG. 5 is a flow chart showing a down link power adjustment process consistent with FIG. 2.

DETAILED DESCRIPTION OF A PREFERRED EMBODIMENT

Figure 1:
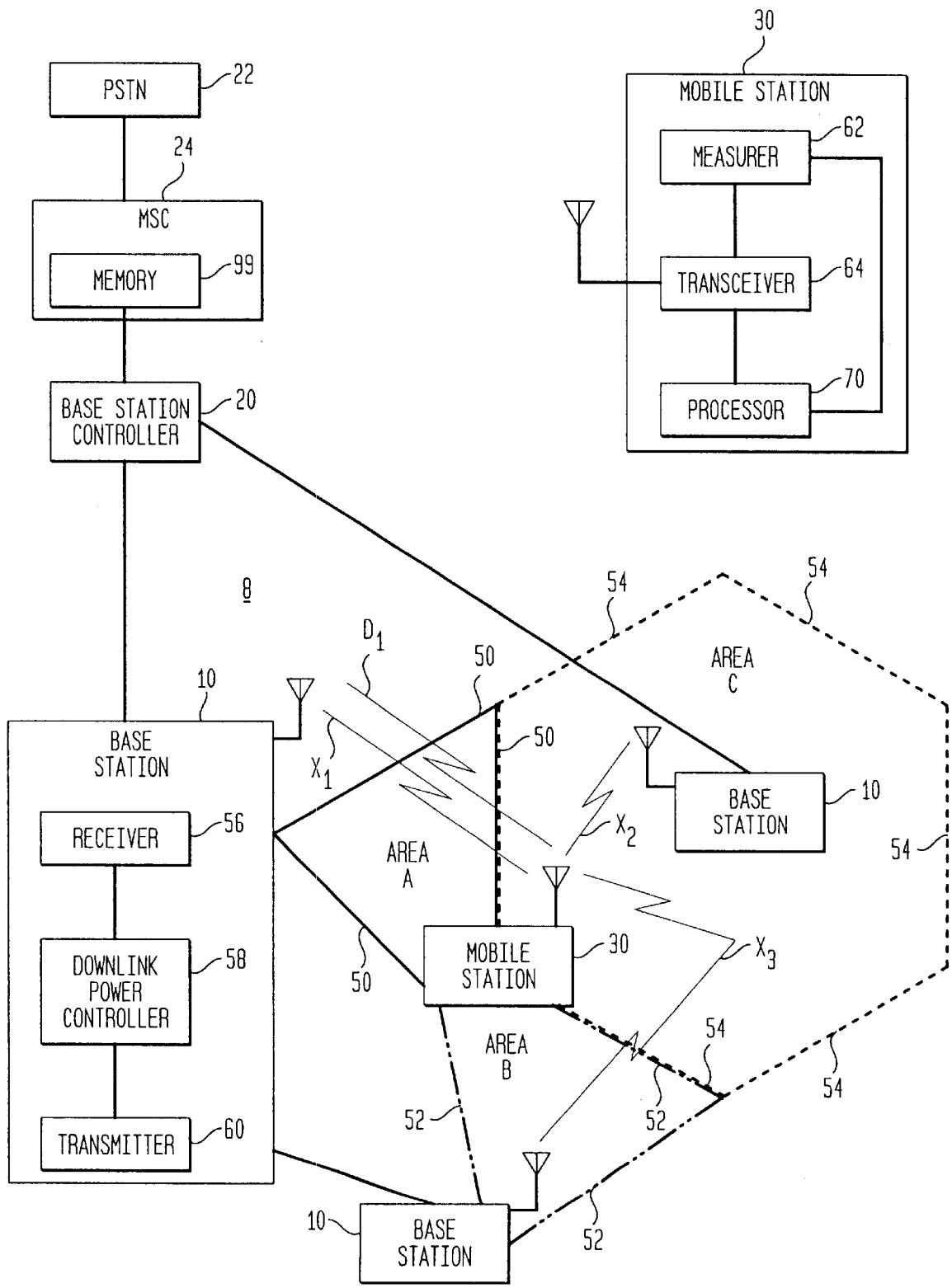
FIG. 1 is a block diagram of a spread-spectrum wireless communications system in accordance with a preferred embodiment of the invention.

In accordance with a preferred embodiment of the invention, FIG. 1 shows a wireless communication system 8 including base stations 10 in communication with a base station controller 20 and a mobile switching center (MSC) 24 coupled to the base station controller 20. The mobile switching center 24, the base station is controller 20, or both may be interconnected to a local public switched telephone network (PSTN) 22 to provide a mobile station 30 with access to telephone service.

The mobile switching center 24 preferably includes memory 99 for storing packet data messages. For example, such packet data messages may result from opting a data channel out of a soft hand-off mode to facilitate reestablishing the data channel after the soft hand-off mode terminates for the mobile station 30. Opting a data channel out of a soft hand-off may facilitate interference reduction or allow the use of wireless infrastructure with less channel capacity.

The base station controller 20 includes a data processing system that controls and manages communications between the base station 10 and the mobile station 30. For instance, the base station controller 20 may assign one or more communications channels of the base stations 10 to the mobile station 30 in response to a mobile call, a landline call, or to support a soft hand-off.

The mobile station 30 includes a transceiver 64 coupled to a measurer 62 and a processor 70. The processor 70 cooperates with the transceiver 64 and the measurer 62 to facilitate control of down link transmit power of the base stations 10 during a soft hand-off. The processor 70 controls the operation of the transceiver 64. The processor 70 may communicate with the measurer 62 and the transceiver 64.

The measurer 62 is arranged to measure signal quality parameters of one or more communication channels transmitted from the base station 10. For example, such signal parameters may include an error rate (e.g., frame error rate (FER)), a signal-to-noise ratio, energy per bit per noise density (Eb/No), energy per chip per interference density (Ec/Io), or another suitable indication of transmission/reception quality. The measurer 62 facilitates the detection of whether a soft hand-off is required for a particular mobile station 30 by measuring Ec/Io for the pilot channels of a neighbor set provided by the mobile switching center. A neighbor set is a list of pilot codes (e.g., pseudo-random noise code offsets) of base stations 10 associated with a particular geographic location of the mobile station 30.

The transceiver 64 may include a rake demodulator for demodulating multiple receive signals transmitted from different base stations 10. The demodulator delays receive signals from different base stations 10 differently to permit coherent combination of the multiple receive signals.

The base station 10 controls down link transmit power during a soft hand-off. The base station 10 includes a down link power controller 58 coupled to a receiver 56 and a transmitter 60. The receiver 56 receives a reverse transmission containing power control data from the mobile station 30 within a coverage area. The transmitter 60 transmits a forward transmission to the mobile station 30 within a coverage area or sector with forward gain adjusted on a pilot-set basis on the power control data received at the base station 10 from the mobile station 30. A pilot set is a set or list of pilot codes (e.g., pseudo random noise code offsets) associated with a particular type of forward channel participating in a soft hand-off. Particular types of forward channels include a data channel, a control channel, a voice channel, and a traffic channel, among others.

The down link power controller 58 adjusts the forward transmit power of one communications channel or a group of communications channels affiliated with each pilot set. The down link power controller 58 and a mobile station 30 may cooperate to maintain multiple inner-loop power control schemes to control the down link power of different base stations 10 participating in the soft hand-off of the particular mobile station 30.

The down link power controller 58 is capable of independently controlling the down link transmit power of a transmitter 60 for multiple communications channels on a common radio frequency carrier to serve multiple mobile stations 30 simultaneously at various stages of calls.

In general, the mobile switching center 24 determines if a forward control channel, for affiliation with a forward data channel of a mobile station 30, is in a soft hand-off. The mobile switching center 24 decides to allocate multiple reverse power control channels if the forward control channel is transmitted from different sectors than the forward data channel and if the forward control channel is in the soft hand-off. The base stations 10 adjusts transmit powers of the forward channels grouped into different physical channels by receiving power control data over the reverse power control channels to compensate for fading of the forward channels. A forward physical channel is a channel that carries a particular type of information (e.g., data, voice, control, or traffic) and is transmitted from one sector or simulcasted simultaneously from two or more different sectors. The information simulcasted over different forward legs of a forward physical channel is identical except for any differences in the pseudo-random code offsets and any Walsh codes used for the different sectors.

The forward control channel is transmitted from different sectors than the forward data channel if the mobile switching center 24 determines that active control sectors of the forward control channel are different in number or identity from at least one active data sector of the forward data channel participating in the soft hand-off. The mobile switching center 24 may determine a number of the reverse power control channels based on a total number of different forward physical channels, where each forward physical channel is associated with at least one corresponding pilot code representing one of the sectors. The physical channels may include a data physical channel and a control physical channel. Accordingly, if so, the adjusting step comprises adjusting the transmit power of the data physical channel independently from the transmit power of the control physical channel serving the mobile station 30 during the soft hand-off. That is, if a certain reverse power control channel services a data channel associated with one set of sectors, other sets of sectors participating in the soft hand-off are able to ignore the signals on the certain reverse power control channel.

In an illustrative scenario of a soft hand-off shown in FIG. 1, a mobile station 30 is located at a coverage boundary of sector A, sector B, and sector C. Sector A is defined by a triangular sector with boundaries indicated by solid lines and labeled reference number 50. Sector B is defined by another triangular sector with boundaries indicated by an alternating dash-dot line labeled with reference number 52. Sector C is defined by a hexagonal cell with boundaries indicated by a dashed line and reference number 54.

The mobile station 30 receives forward control channels X1, X2, and X3 from three different base stations 10 associated with sectors A, B, and C, respectively. The control channels X1, X2, and X3 are supported by underlying carriers that are generally co-frequency. The control channels X1, X2, and X3 are simulcasted on differently coded carriers with different pilot codes (e.g., pseudo-random noise codes that are temporally offset from each other to achieve orthogonality). Here in FIG. 1, the data channel D1 is transmitted by only one base station 10, although the data channel signal could be simulcasted by two or three of the base stations 10 participating in the soft hand-off. In practice, each control channel may be multiplexed with a voice channel, or another traffic channel. The data channel may be carried on the same carrier with the same pseudo-random noise code as the control channel.

The data channel D1 preferably has a different Walsh code than control channel X1 to define two distinct down link logical channels for the mobile station 30. Because the number of data channels is less than the number of control channels, the scenario is regarded as a reduced active set scenario in a soft hand-off. The mobile switching center decides to allocate multiple reverse power control channels because the forward control channel is transmitted from different sectors than the forward data channel during the soft hand-off. In the example of FIG. 1, two reverse power control sub-channels or power control channels (e.g. logical channels) may be applied to control the down link transmit power of the control and data channels because two distinct pilot sets are presented to the mobile station 30, which is centrally located between sectors A, B, and C. Pilot sets are distinct if the pilot codes (or offsets) within the pilot sets differ in number or identity. Here, a first pilot set for the control channel is associated with X1, X2, and X3, whereas a second pilot set for the data channel is associated with D1. Therefore, the pilot sets differ in number, wherein the first pilot set contains three pilot codes (or PN code offsets) and the second set contains one pilot code (or one PN code offset).

An active set refers to a list of pilot code data (e.g., pilot psuedo-noise offsets) for corresponding sectors that are actively communicating with the mobile station on traffic channels. As used herein, a pilot code shall, by definition, include a psuedo-random noise code offset (e.g., PN code offset) or any other information used for generating a pilot code sequence or a group of orthogonal code sequences. In a typical code-division multiple access system, neighboring base stations temporally offset the same psuedo-random noise code to form different psuedo random noise code sequences that are generally orthogonal to each other. A sector refers to any directional coverage area or omnidirectional coverage pattern for a forward signal originating from a base station. The active set is determined by the wireless infrastructure to meet capacity constraints of the infrastructure, or otherwise. An active set may be defined according to the number of pilot codes of forward pilot channels within the active set. A full active set includes a complete group of the pilot codes of forward pilot channels transmitted to a particular mobile station 30 during a soft hand-off. A reduced active set includes only one or some of the complete group of pilot codes of forward pilot channels transmitted to a particular station during a soft hand-off.

An active set or a reduced active set may include data pilot set of pilot codes (e.g., pilot code offsets) for a data channel, a voice pilot set of pilot codes for a voice channel, and a control pilot set of pilot codes (e.g., pilot code offsets) for a control channel, among other possibilities for the foregoing active set components. If a control pilot set has a full complement of all pilot codes of the full active set for a particular hand-off, the control pilot set is referred to as a full pilot set. If a data pilot has a lesser number of pilot codes than the full active set for a particular hand-off, the data pilot set is referred to as a reduced pilot set.

A forward physical channel refers to a channel or group of simulcasted forward channels, which carry substantially identical information to a mobile station 30 during a soft hand-off. The mobile station 30 may combine the simulcasted channels in a rake receiver to yield diversity reception gain for the physical channel. A forward physical channel may be classified according to the type of channel or simulcasted channels that the physical channel supports. A voice physical channel refers to a forward voice channel or simulcasted forward voice channels for a particular mobile station during a soft hand-off. A control physical channel refers to a forward control channel or simulcasted forward control channels for the particular mobile station during a soft hand-off. A data physical channel refers to a forward data channel or simulcasted data channels for the particular mobile station during a soft hand-off.

FIG. 2 shows a flow chart of a method for establishing a forward data channel with appropriate power control on the forward link to compensate for Rayleigh fading within and outside of a soft hand-off.

In step S10, a mobile switching center 24 or a base station controller 20 requests the setup of a data channel to send data packets on the forward link to mobile station 30. For example, the mobile switching center 24 may initiate the setup of a data channel in response to the receipt of a data message addressed to the mobile station 30.

In step S11, the base station controller 20 or the base station 10 identifies a control channel serving the mobile station 30 for affiliation with the data channel. If the mobile station 30 is actively communicating with a base station 10, the mobile station 30 may receive forward signals from at least one control channel. The existing control channel preferably may be used to service the newly added data channel.

In practice, a control channel may be multiplexed with a corresponding voice channel onto a common composite channel over the air interface of a code-division multiple-access system. For example, both the control channel and its affiliated voice channel may use the same Walsh code and the same pseudo-random noise code over a carrier. The number of multiplexed voice/control channels may differ from the number of data channels because of air interference considerations or available power resources at base stations 10.

In step S12, the mobile switching center 24 determines if the control channel is in a soft hand-off. Because the mobile switching center 24 is responsible for allocating appropriate channels for simulcasting to a mobile station 30 in a soft hand-off, the mobile switching center 24 is readily able to determine if the control channel is in a soft hand-off. The mobile switching center 24 may place a mobile station 30 into a soft hand-off in response to a message from the mobile station 30 indicating the presence of a new suitable pilot.

Regarding the forward link, a mobile station 30 in a soft hand-off simultaneously receives forward traffic signals from an active set of pilot codes (e.g., PN code offsets) of base stations 10. The rake receiver combines the separate forward traffic signals into a composite signal to obtain a diversity signal reception improvement. Regarding the reverse link, the mobile station 30 transmits reverse signals back to multiple base stations 10. The mobile switching center 24 or a signal evaluator selects the reverse signal with the best signal quality for routing to the other party of a call or a message transmission.

If the mobile switching center 24 determines that the control channel is in a soft hand-off, the method continues with step S14. In step S14, the mobile station 30 determines the best (e.g., strongest signal strength) forward pilot channel or the best (e.g., strongest signal strength) forward pilot channels for the particular geographic location of the mobile station 30. The mobile station 30 monitors one or more pilot channels that support the control channel during the soft hand-off. The mobile station 30 measures the Ec/Io (energy per chip per interference density) of the pilot channel for each pilot channel on the neighbor set, candidate set, and active set, or otherwise. The candidate set contains a list of pseudo-random noise (PN) offsets with Ec/Io which is greater than or equal to a minimum threshold consistent with a hand-off candidate. The neighbor set contains a list of PN offsets that are on the neighbor set relative to the sector that is currently serving the mobile station 30. The neighbor set is provided by the base station controller 20 or otherwise through a neighbor message transmission to the mobile station 30. The active set includes, for example, a list of PN offsets that presently serve the mobile station 30 for the soft hand-off.

Thereafter in step S16, the base station 10, the base station controller 20, and the mobile switching center 24 cooperate to setup a data channel associated with one or more of the best (e.g., strongest) pilots. The Ec/Io of a strongest pilot preferably exceeds the Ec/Io of other pilots by a margin and exceeds the Ec/Io required for the pilot members of the candidate set.

In a preferred embodiment, the data channel associated with a single pilot channel in step S16, whereas the traffic channel and its underlying control channel are associated with multiple pilots to support the soft hand-off. Because the control channel is preferably multiplexed onto the voice channel to form a composite channel, the traffic capacity is not degraded by using a group or all of the available composite channels for the soft hand-off. On the other hand, the data channel may be placed on a separate channel apart from the composite channel which may consume additional base-station resources. Further, the data channel tends to be configured as a packet service in the simplex mode on the down link; the data channel may be broadcasted with higher signal gains than its affiliated composite channels. To reduce interference and minimize the use of base station resources, one data channel will frequently be used in conjunction with multiplexed control/traffic channels during a soft hand-off. Nevertheless, the data channel may be transmitted over a single carrier or simulcasted over multiple carriers participating in the soft hand-off and still fall within the scope of the invention.

In step S16, the base station may setup the data channel to be associated with the same pseudo-random noise code as one of the control channels. Further, the base station may transmit the data channel and the control channel over the same frequency. In practice, in some communication systems a control channel may be a two-way channel whereas a data channel may be a one-way or simplex channel. The control channel is preferably present continuously during the soft hand-off. In contrast, the data channel may be intermittent or continuously operating.

Subsequently, in step S18 the mobile switching center 24 or the base station controller 20 informs the mobile station 30 of the assignment of the data channel in an assignment message. For example, the base station controller 20 may instruct the base station 10 to transmit a hand-off direction message to the mobile station 30 with appropriate PN offsets for the active set and the Walsh codes of the voice channels and the data channel.

Then, in step S20 the mobile switching center 24 determines the number of multiple reverse power control channels for controlling down link power of the base station 10. The number of allocated power control channels is preferably based on the total number of different pilot sets carrying channels for a mobile station 30 during a soft hand-off. Each different pilot set supports a different physical channel or a different group of physical channels during a soft hand-off. The mobile station 30 preferably sends the same power control information to each base station 10 participating in an active set during a soft hand-off. Thus, the physical channels or groups of physical channels of the same pilot set are powered up or down as a group, without specific regard to any individual forward propagational path between the base station 10 and the mobile station 30, but rather with regard to the rake receiver's aggregate reception of multiple carriers from different base stations 10.

In accordance with a preferred technique, the number of power control channels or sub-channels is based on the total number of different pilot sets.

After determining the appropriate number of reverse power control channels for a soft hand-off, the mobile switching center 24 may command the base station 10 to transmit a power control allocation message to the mobile station 30. The power control allocation message may be transmitted over the forward control channel. The power control allocation message instructs the mobile station 30 to use the appropriate number of multiple power control channels over the reverse link. The mobile station 30 establishes multiple power control channels on the reverse link based on the power control allocation message.

To the extent that the data channel experiences different Rayleigh fading than the voice channel and the underlying control channels, separate power control channels are required. In most cases, the fading of channels will occur along the lines of the pilot channels. That is, if a control channel and data channel are associated with a common pilot channel, the control channel and the data channel will experience strongly correlated or identical fading.

The multiple power control channels of step S20 may be established in accordance with at least two alternate techniques. Under a first technique, the mobile station uses multiple discrete reverse power control channels at the maximum bit rate which is commensurate with the frequency of fast fading to compensate for fading of the forward control channels during a soft hand-off. For example, a bit-robbing technique robs a maximum bit rate (e.g., within a. range from 400 bps (bits per second) to 800 bps) of multiple traffic channels vocoded at the full vocoding rate of the reverse link. Traffic channels include voice channels, data channels, or both. The bit-robbing technique provides the rapid response time such that the down link transmit power of the base station can be adjusted in a sufficiently timely manner to compensate for Rayleigh or fast-fading.

Under a second technique, the reverse link power control channels are preferably multiplexed onto a reverse pilot of a reverse link in accordance with a bit-robbing technique that steals bits from information on the pilot channel. The maximum bit rate of transmission capacity are divided among the total number of multiple power control channels required. In an alternate embodiment to the second technique, the foregoing bit robbing technique may apply to any reverse channel other than the pilot channel.

The first and second techniques both entail multiple power control channels that facilitate multiple independent inner-loop transmit power control of the forward link during the soft hand-off to compensate for a fading environment under a reduced active set scenario, for example.

Although the error correction techniques may mitigate the effects of fading by masking error rates at the network layer, the error correction may introduce delay or decrease throughput. In accordance with the invention, the multiple power control channels independently control power during the soft hand-off to reduce the delay or increase throughput of the data channel by ameliorating the foregoing need for error correction.

Finally, in step S21 the mobile station 30 sends power control data over the multiple power control channels to compensate for fading (e.g., Rayleigh fading) of the down link signal. The mobile station 30 determines the power control data based on measurements of the forward channels participating in the soft hand-off on a physical channel basis. The power controller at the base station 10 adjusts the forward transmit power of the different physical channels (or groups of physical channels) affiliated with each pilot set independently based on the received power control data. The base stations 10 associated with a common pilot set power up and down as a group for the channels associated with the common pilot set.

In an alternate procedure to step S21, the transmit power of different physical channels is preferably independently adjusted such that the groups of channels associated with the same forward carrier of the same base station are adjusted in an identical or correlated manner.

In step S21, the transceiver 64 of the mobile station 30 communicate with several base stations 10. The mobile station 30 transmits a unique privacy code (e.g., long-code) that is known by each base station 10 participating in a soft hand-off. Each base station 10 only recognizes a particular privacy code as valid for the mobile station 30. Base stations 10 that do not carry the data channel during the soft hand-off will ignore the power control command sent by the mobile station over the reverse link.

If the mobile switching center 24 determined that the control channel is not in a soft hand-off in step S12, the method continues with step S22. In step S22, the data channel is setup on the same pilot as the affiliated control channel for the mobile station. For example, the mobile switching center 24, the base station controller 20, and the base station 10 cooperate to setup a down link data transmission to the mobile station 30 associated with a single pilot channel. The pilot channel is affiliated with both a data channel and a control channel.

In step S24, the mobile switching center 24 informs the mobile station 30 of the assignment of the data channel in an assignment message that contains the necessary information to decode the data channel and the control channel.

In step S26, the base station controller 20, the base station 10, and the mobile station 30 cooperate to establish a single power control channel over the reverse link of the mobile station 30. Accordingly, the mobile station 30 uses one power control channel (or sub-channel) to support the forward power control for both the data channel and the control channel, which are associated with the single pilot channel.

In step S27, the mobile station 30 sends power control data over to the base station 10 on the single power control channel based on ongoing measurements of the forward data channel and control channel. Upon receipt of the power control data, the power controller in the base station 10 adjusts the forward transmit power of the control channel and its affiliated data channel over the single power control channel.

In accordance with one aspect of the invention, a mobile switching center judges if a forward control channel, for affiliation with a forward data channel of a mobile station, is in a soft hand-off. The mobile switching center allocates multiple reverse power control channels if the forward control channel is transmitted in association with different pilot codes than the forward data channel and if the forward control channel is in the soft hand-off. The mobile switching center determines a number of the reverse power control channels based on a total number of distinct physical channels associated with the different pilot codes of the forward channels.

In allocating the multiple reverse power channels, the mobile switching center may consider the different pilot codes as including a full pilot set (e.g., PN pilot offsets of a control channel) of pilot codes and at least one reduced set (e.g, PN code offsets of a data channel), with a lesser number of pilot codes than the full set. Both the reduced set and the full set participate in the same soft hand-off of a particular mobile station. In one example, the mobile switching center requires at least two power control channels if the forward control channel is simulcasted and associated with a full set of pilot codes and if a data channel is associated with a reduced set, with a lesser number of pilot codes than the full set, for the mobile station during the soft hand-off. In another example, the mobile switching center requires at least three power control channels if the forward control channel is simulcasted and associated with a full set of pilot codes, if a first data channel is associated with first reduced set, and if a second data channel is associated with a second reduced set having at least one different constituent pilot code from the first reduced set for the mobile station during the soft hand-off.

FIG. 3A through FIG. 3D are charts illustrating possible power control channel assignments consistent with step S20 of FIG. 2. In FIG. 3A through FIG. 3D, a first column corresponds to a forward pilot designator or source sector identifier for all of the differently coded pilot channels participating in a soft hand-off. The second column corresponds to the forward channels associated with the corresponding pilot in the first column. Finally, the third column corresponds to a designator of a reverse power control channel associated with the corresponding forward channels associated with each pilot of second column. The assignment of reverse power control channels in FIG. 3A through FIG. 3D is consistent with the reduction of fading in the context of the soft hand-off.

In general, the number of power control channels is commensurate with or equal to the number of distinct sets of pilot codes (or pilot code offsets). For example, two power control channels or sub-channels accommodates the pilot assignments illustrated in FIG. 3A, while one power control channel accommodates the pilot assignment of FIG. 3B.

FIG. 3A includes two distinct pilot sets: (1) a control pilot set of forward pilot designators A and B and (2) a data pilot set of forward pilot designator A. The distinct pilot sets are different in number and identity. Two power control channels are required. The first reverse power control channel, labeled 1, is associated with the two simulcasted control channels that form a single physical control channel as perceived by the mobile station 30. The second reverse power control channel, labeled 2, is associated with the data channel.

FIG. 3B includes one distinct pilot set because a control pilot set of forward pilot designators A and B is identical to the data pilot set of forward pilot designators A and B. The two pilot sets are identical in number and identity; hence, are counted as one distinct pilot set for purposes of the invention. One reverse power control channel is required. The first reverse power control channel, labeled 1, is associated with the two simulcasted control and data channels that form a single physical channel as perceived by the mobile station 30.

In other contexts, illustrated in FIG. 3C and FIG. 3D, two or more power control channels or sub-channels are required to provide adequate compensation for fading (e.g., Rayleigh fading). FIG. 3C includes two distinct pilot sets: (1) a control pilot set of forward pilot designators A, B, and C and (2) a data pilot set of forward pilot designators A and B. The distinct pilot sets are different in number and identity. Two power control channels are required. The first reverse power control channel, labeled 1, is associated with the three simulcasted control channels that form a single physical control channel as perceived by the mobile station 30. The second reverse power control channel, labeled 2, is associated with the two simulcasted data channels as a data physical channel as perceived by the mobile station 30.

FIG. 3D includes two distinct pilot sets: (1) a control pilot set of forward pilot designators A, B, and C and (2) a data pilot set of forward pilot designator A. The distinct pilot sets are different in number and identity. Two power control channels are required. The first reverse power control channel, labeled 1, is associated with the three simulcasted control channels that form a single physical control channel as perceived by the mobile station 30. The second reverse power control channel, labeled 2, is associated with the single transmitted data channel as a data physical channel.

In accordance with FIGS. 3A–FIG. 3D, providing reverse power control along the lines of distinct groups of pilot codes may produce independent compensation for fast fading of the forward data channel and the simulcasted control channels. The receiver of the mobile station 30 preferably realizes some diversity reception gain of the simulcasted forward control channels controlled by the one of the reverse power control channels.

Figure 4:
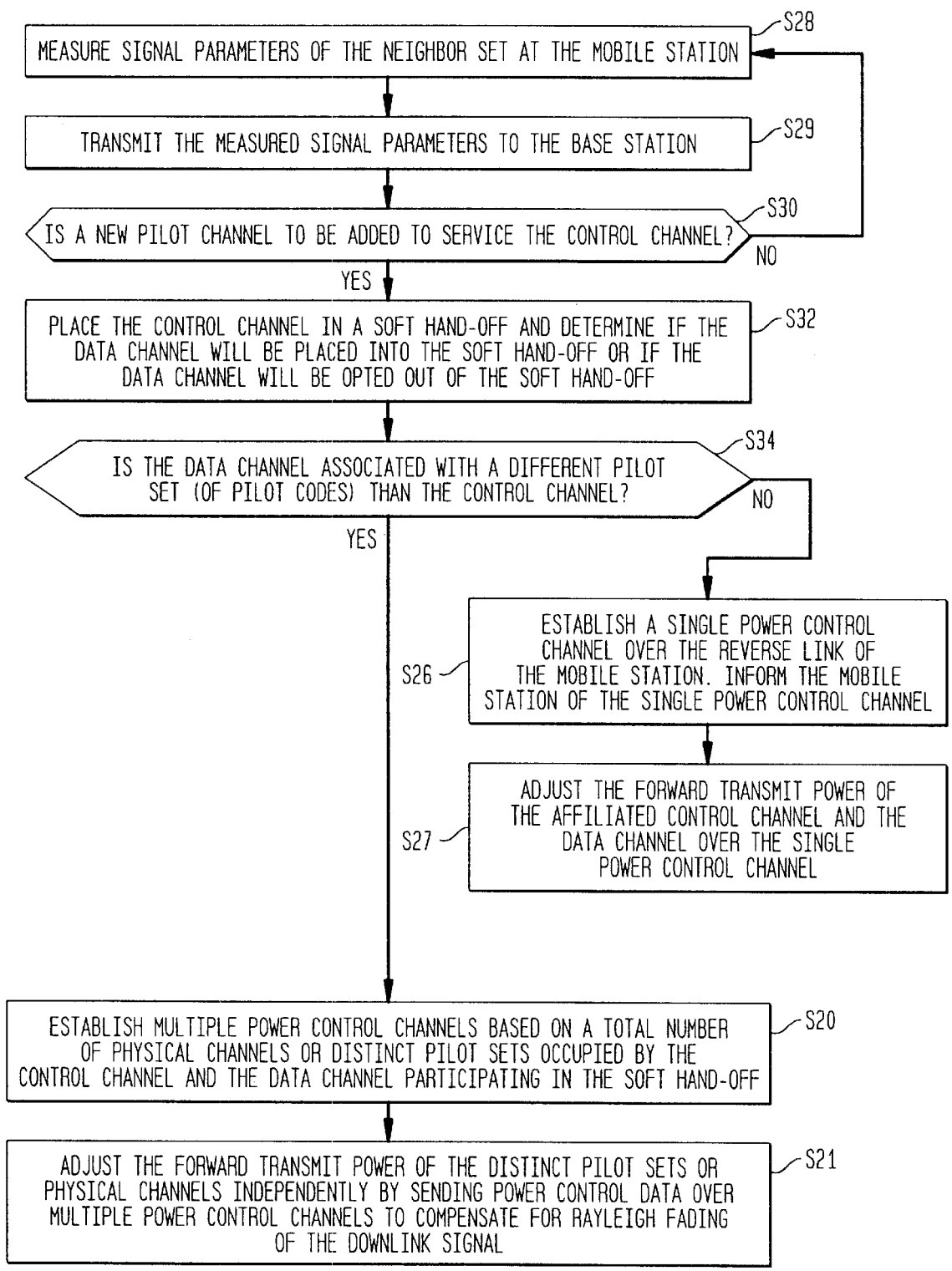
FIG. 4 is a flow chart of a method for controlling power of forward channels after the setup of a data channel in accordance with a preferred embodiment of the invention.

FIG. 4 represents a continuation method of FIG. 2. Like reference numerals in FIG. 2 and FIG. 4 indicate like steps. The method of FIG. 4 supports the data channel as the mobile station progresses through different coverage areas in the wireless system, requiring a soft hand-off. In FIG. 4, the mobile station 30 transmits multiple power channels or sub-channels on the reverse link to compensate for fading (e.g., Rayleigh fading) of the forward links, where a forward control channels is in a soft hand-off mode and where the data channel is associate with a different pilot set of pilot codes (e.g., PN code offsets) than the forward control channels.

Starting in step S28, the mobile station measures signal parameters (e.g., Ec/Io) of the neighbor set. For example, the mobile station monitors the neighbor set by regularly measuring Ec/Io of each pilot channel on the neighbor set.

In step S29, a mobile station 30 may transmit measured signal parameters to the base station 10, or a derivative message based thereon. For example, if the measured signal parameter of a particular pilot channel exceeds a threshold signal parameter measurement (e.g., a threshold Ec/Io), the pilot channel is added to a candidate set and the mobile station 30 sends a pilot measurement message so indicating to the base station 10. The base station 10 may route the pilot measurement message to the base station controller 20 or the mobile switching center 24.

Thereafter, in step S30 the mobile switching center 24 determines whether to add a new pilot channel to service the control channel. For example, the mobile switching center 24 determines if a new pilot is to be added to the active list from the candidate list based on an evaluation of the pilot measurement message and other wireless system conditions. If the mobile switching center 24 decides to add the new pilot to service the control channel, the method continues in step S32. However, if the mobile switching center 24 decides not to add a new pilot to service the control channel the method returns to step S28.

In step S32, the mobile switching center 24 places the control channel in a soft-handoff and determines if the data channel will be placed into the soft hand-off (along with the control channel) or if the data channel will be opted out of the soft hand-off. For example, the mobile switching center 24 places the control channel in a soft hand-off based on the mobile station pilot measurement message. The mobile switching center 24, the base station controller 20, and multiple base stations cooperate to place the control channel in a soft hand-off mode.

The mobile switching center 24, the base station controller 20, or both instruct the base station 10 to transmit a hand-off direction message to the mobile station 30. The hand-off direction message may contain the PN offset and the Walsh code of the new control channel or another pilot code for the new control channel.

In step S32, the soft hand-off is driven by the traffic channel and its underlying control channel, as opposed to the data channel. The data channel preferably is a packet type transmission that is transmitted in occasional bursts, rather than a continuous, uninterrupted succession of bursts. In contrast, the traffic channel and its underlying control channel provide a generally continuous flow of data, which may be interrupted for pauses in a voice conversation. Typically, the pauses in the voice conversation result in reduced vocoding rates.

The mobile switching center 24 controls whether the data channel participates in the soft hand-off or opts out of the soft hand-off process. If the data channel is opted out of the soft hand-off, the data channel may go dormant until the mobile station 30 resurfaces with an active set of one pilot channel in a post soft hand-off mode. Alternately, if the data channel is opted out of the soft hand-off, the data channel may be established over a different carrier of the source base station or a destination carrier pursuant to a digital-to-digital or a digital-to analog hard hand-off. The soft hand-off opt-out procedure accommodates base stations 10 that may have insufficient physical channels or limitations of interconnect between base stations and mobile switching center 24, that prevent every base station from carrying a data channel for the soft hand-off. Further, reducing the number of participating data channels in the soft hand-off may reduce interference and increase wireless system capacity by reducing the traffic used during a soft hand-off.

From step S32, the method proceeds to step S34, wherein the mobile switching center 24 determines if the data channel is carried on a different pilot set of pilot codes (e.g., pilot code offsets) than the control channel. Carriers are regarded as distinct when the carriers use different pseudo-random codes or different pilot codes. The mobile switching center 24 may complete the foregoing determination of step S34 in accordance with at least three alternative techniques.

In accordance with a first technique, the data channel is carried on a different pilot set than the control channel if each participating pilot channel is not associated with both a forward data channel and a forward control channel for the mobile station 30 in the soft hand-off.

In accordance with a second technique, the mobile switching center 24 compares a data pilot set to a control pilot set. A data pilot set is the pilot set of pilot codes (e.g., PN offset codes) of the data channel or channels for a mobile station in a soft hand-off. A control pilot set is the pilot set of pilot codes (e.g., PN offset codes) of the control channels for a mobile station in a soft hand-off. The data pilot set and the control pilot set each are characterized by a respective number of pilot codes (e.g., PN code offsets), among other things. If the number of pilot channels of the data pilot set is different from the number of pilot channels of the control pilot set, the data channel is carried on a distinct pilot set.

In accordance with a third technique, the mobile switching center 24 compares the data pilot set to the control pilot set. The data pilot set and the control pilot set are each characterized by the identity of PN offsets associated with the pilot channels, among other things. If the identity of the PN offsets associated with the data pilot set is different from the identity of the PN offsets associated with the control pilot set, the data channel is carried on a distinct pilot set.

A reduced active set is characterized by the number of control channel legs differing from the number of data channel legs supporting the soft hand-off on the downlink signal for the mobile station 30. Reduced active sets are employed for soft hand-offs reduce or minimize the interconnect requirements between base stations 10 and the mobile switching center 24 and to reduce interference over the air interface. However, the resistance to fading is sometimes decreased by reducing the active set because the ability to coherently combine duplicative data channels from different base stations is eliminated or reduced. Even though error correction can compensate somewhat for the fading and reduced diversity reception gain of the rake demodulator, processing delays associated with error correction may decrease throughput. Accordingly, the power control scheme of the present application is well-suited for reducing fading without decreasing throughput.

If the data channel is carried on a different pilot set in step S34, the method continues with step S20, which is followed by step S21. Step S20 and step S21 in FIG. 4 are the same as those like-numbered steps previously described in conjunction with FIG. 2.

If the data channel is carried on a substantially identical or the same pilot set in step S34, then the method continues with step S26, which is followed by step S27. Steps S26 and S27 were previously described in conjunction with FIG. 2.

As illustrated in FIG. 5, the mobile and the base stations preferably cooperate to maintain multiple inner-loop power control schemes to control the downlink power of different base stations participating in the soft hand-off of the mobile station 30.

To better understand the operation of a multiple inner-loop power control scheme of a preferred embodiment of the invention, the following description of inner-loop and outer-loop downlink power control in the CDMA environment is provided. In accordance with the inner-loop power control, the measurer 62 associated with the transceiver 64 of a mobile station 30 measures average Eb/Io (bit energy to noise (e.g., interference) density level) received from a base station 10. A mobile station 30 transmits commands over the forward link to the base station 10 to adjust the base station's transmitted power. For example, if the Eb/Io was higher than a reference Eb/Io, then the base station's transmitted power is reduced by an increment. On the other hand, if the Eb/Io is lower than a reference Eb/Io, then the base station's transmitted power is increased by an increment. The Eb/Io reference may depend upon the multipath environment and the desired error performance, among other factors, for appropriate inner-loop power control.

In addition to the above inner-loop power control in which a mobile station 30 measures the Eb/Io of a base station 10, the mobile station 30 may measure a base stations 30 error rate to adjust the reference Eb/Io in accordance with an outer-loop control scheme. Outer-loop power control refers to the measuring of error rate and adjustment of the above reference Eb/Io. The outer-loop can change the initial inner-loop target to a revised inner-loop target value upon a measurement of a frame-error rate, for example. Accordingly, the transmit power of the base station 10 is adjusted to maintain a given error rate per each voice frame or message packet. In practice, the error rate is often arranged to provide less than a certain target percentage of severely errored or errored seconds per call. Although the inner-loop and outer-loop power control are described with reference to downlink power control, similar outer-loop and inner-loop power control schemes may be applied to the uplink power control. The above inner-loop and outer-loop power control mechanisms are used to control the power levels of the control channels in a CDMA wireless system.

In accordance with transmit power adjustment and multiple power control channels of the invention, two or more simultaneously operating inner-loop power control schemes are used independently, as illustrated in the following example. A first inner-loop handles power control for a first pilot set. For example, the first active set may be associated with a simulcasted control channel from tow or more base stations 10 during a soft hand-off. A second inner-loop handles power control of a second pilot set. For example, the second pilot set may be associated with a data channel alone transmitted from one base station 10 during the soft hand-off. The first inner-loop has a first signal parameter target and the second inner-loop has a second signal parameter target. The different targets are necessary because the propagational path; hence, the fading environment differs between the base station and the mobile station 30 for the control physical channel and the data physical channel. Accordingly, the forward link from the base station is made more reliable when a first inner-loop can compensate for fading associated with one single or composite propagational forward link path and when a second inner-loop can compensate for fading associated with another single or composite propagational forward link path.

The multiple-inner loop power control schemes may be advantageously transmitted over a common physical channel or different power control channels as previously described. The software instructions for soft hand-offs used by the mobile station 30 and the base stations must be compatible with multiple power control channels.

FIG. 5 shows step S21 of FIG. 2 in greater detail. Starting in step S118, the mobile station 30 receives different physical downlink channels. The wireless system preferably associates the different physical channels with at least one corresponding pilot set for a mobile station during the soft hand-off. Each pilot set refers to a set or group of pilot codes (e.g., pseudo-noise codes) of pilot channels that serve a mobile station during a soft hand-off.

The different physical downlink channels may be carried over one or more differently coded carriers. Each differently coded carrier has a corresponding pilot code (e.g., PN code offset) of a particular base station 10 or sector thereof. The different carriers can carry a composite channel (e.g., control channel multiplexed with a voice channel), a voice channel, a control channel, a data channel, a traffic channel, an overhead channel, or any combination of the foregoing channels.

In step S120 after step S118, if multiple distinct groups of pilot codes are present, the mobile station 30 establishes a target signal parameter value associated with each different pilot set to compensate for differential fading among the various physical forward channels received at the mobile station 30. For example, the mobile station 30 establishes a first target associated with a full pilot set (e.g., for a control channel) and a second target associated with a reduced pilot set (e.g., for a data channel) because the reduced pilot set and the full pilot set represent distinct groups of pilot codes. The full pilot set may support one physical channel, while the reduced pilot set supports a different physical channel to permit differential compensation for fading among different physical channels.

In step S122, the mobile station 30 measures a received signal parameter value at the mobile station 30 during the soft hand-off for each distinct pilot set or the different physical channels associated with the pilot sets.

In step S124, the mobile station 30 compares the measured signal parameter to the target signal parameter value each pilot set. The processor 70 establishes a target signal parameter value associated with a physical channel associated with each pilot set, which is received at the mobile station 30. The processor 70 compares the measured signal parameter to the target signal parameter value for each different pilot set.

In step S126, the mobile station 30 transmits power adjustment data over the multiple local power control channels based on the comparison between the target signal parameter value and its corresponding measured signal parameter value for each distinct pilot set or different physical channel.

The method of FIG. 5 may be further explained by the following example, where a separate data channel and a control channel on different carriers participate in a soft hand-off. Accordingly, a mobile station 30 may establish a data target value and control target value. The mobile station 30 measures the physical data channel and the control channel (e.g., a group of logical channels originating from different sectors) to attain a data measurement and a control measurement for comparison to the data target and the control target, respectively. Two different power control channels can send independent power control commands to the base stations to power up or power down the base stations as appropriate.

In accordance with the invention, the mobile switching center determines whether or not to use multiple power control channels or sub-channels on the reverse link to compensate for fading on the forward control channels and data channel. A single power control channel or multiple power control channels on the reverse link are used to facilitate compensation for Rayleigh fading of the forward data and control channels. If the data channel is associated with a different pilot set of pilot codes (e.g., PN code offsets) than the control channels, then multiple power control channels are used. Otherwise, only a single power control channel is used to capture the maximum bit rate available for timely correction of Rayleigh fading.

Multiple power control sub-channels preferably use a bit-robbing technique on the reverse link to provide a sufficiently rapid response time for power adjustment of the downlink signal. As a result, under one technique the maximum bit rate or correction rate of downlink power is reduced when divided among multiple power sub-control channels, as opposed to a single power control channel or multiple power control channels operating at the maximum bit rate. Because the reduction in the correction rate may decrease the effectiveness of power compensation for Rayleigh fading, the present method advantageously applies multiple power sub-control channels where the benefit of increased reliability of a data channel transmission outweighs the reduction in the correction rate.

In the context of a reverse link of a soft hand-off in a CDMA wireless system, reduced active sets are seldom used. Near-far-interference potential and attendant reduced traffic capacity reduces the desirability of using reduced active sets for reverse links. Thus, although the multiple inner-loop schemes set forth herein could be applied to the reverse link as well as the forward link, practical considerations favor using multiple inner-loops alone for the forward link during a soft hand-off.

This specification describes various embodiments of the method and system of the present invention. The scope of the claims is intended to cover various modifications and equivalent arrangements of the illustrative embodiments disclosed in the specification. Therefore, the following claims should be accorded the reasonably broadest interpretation to cover the modifications equivalent structures, and features, which are consistent with the spirit and scope of the invention disclosed herein.

What is claimed is:

1. A method for controlling downlink transmit power in a wireless system, the method comprising:

instructing allocation of multiple reverse power control channels if a forward control channel serving a mobile station is transmitted from a different set of sectors than a forward data channel of the mobile station, the forward data channel associated with the forward control channel, and if base stations associated with the forward control channel are participating in a soft hand-off of the forward control channel; and adjusting transmit powers of the forward channels based on the reverse power control channels associated with the forward channels.

2. The method according to claim 1 wherein the instructing step comprises determining if active control sectors of the forward control channel are different in number from at least one active data sector of the forward data channel participating in the soft hand-off.

3. The method according to claim 1 wherein the instructing step comprises determining if active control sectors of the forward control channel are different in identity from at least one active data sector of the forward data channel participating in the soft hand-off.

4. The method according to claim 1 wherein the instructing step comprises determining a number of the reverse power control channels based on a total number of different forward physical channels, each forward physical channel associated with at least one corresponding pilot code representing one of said sectors.

5. The method according to claim 1 wherein the adjusting step comprises adjusting the transmit power of the data channel independently from the transmit power of the control channel serving the mobile station during the soft hand-off.

6. The method according to claim 1 wherein the instructing step comprises instructing multiple reverse power control channels over separate channels, each separate channel defined by bit robbing to provide a channel with a transmission capacity of 400 bits per second to 800 bits per second to compensate for fading.

7. The method according to claim 1 wherein the instructing step comprises instructing multiple reverse power control channels over separate channels, each separate channel defined by bit robbing from a reverse pilot channel.

8. The method according to claim 1 wherein the adjusting step further comprises the step of:

maintaining multiple inner-loop power control schemes to control the forward transmit power of different base stations participating in the soft hand-off of the mobile station.

9. A method for controlling downlink transmit power in a wireless system, the method comprising:

instructing the allocation of multiple reverse power control channels if a forward control channel is transmitted in association with a different set of pilot code offsets than a forward data channel, associated with the forward control channel, and if base stations associated with the forward control channel are participating in a soft hand-off; and determining a number of the reverse power control channels based on a total number of distinct physical channels associated with the different sets of pilot code offsets of the forward channels, where the physical channels are realized by the base stations.

10. The method according to claim 9 wherein the instructing step further comprises defining different sets of pilot code offsets, including a full set of pilot code offsets and at least one reduced set, with a lesser number of pilot code offsets than the full set, for participation in the soft hand-off.

11. The method according to claim 9 wherein the determining step comprises requiring at least two power control channels if the forward control channel is simulcasted and associated with a full set of pilot code offsets and if the data channel is associated with a reduced set, with a lesser number of pilot code offsets than the full set.

12. The method according to claim 9 wherein determining step comprises requiring at least three power control channels if the forward control channel is simulcasted and associated with a full set of pilot code offsets, if a first data channel is associated with first reduced set, and if a second data channel is associated with a second reduced set having at least one different constituent pilot code offset from the first reduced set.

13. The method according to claim 9 further comprising the steps of:

receiving different physical downlink channels associated with corresponding distinct pilot sets of the pilot code offsets serving the mobile station during the soft hand-off;

allocating a target signal parameter value associated with each distinct pilot set of pilot code offsets received at the mobile station;

measuring a received signal parameter at the mobile station during the soft hand-off for each distinct pilot set of pilot code offsets;

comparing the measured signal parameter to the target signal parameter value for each distinct pilot set of pilot code offsets; and transmitting power adjustment data over the multiple power control channels based on the comparison between the target signal parameter value and its corresponding measured signal parameter value for each distinct pilot set.

14. The method according to claim 9 further comprising determining a number of reverse power control channels based on a total number of distinct physical channels associated with corresponding distinct sets of pilot code offsets, where the physical channels are associated with a plurality of base stations participating in the same soft hand-off.

15. The method according to claim 14 wherein the physical channels include a data physical channel for the data channel and a control physical channel for the control channel.

16. A method for controlling downlink transmit power in a spread-spectrum wireless system, the method comprising:

determining if a new pilot channel is to be added to service a forward control channel for a mobile station;

placing the forward control channel in a soft hand-off mode and determining whether an affiliated forward data channel, affiliated with the control channel, is placed into the soft hand-off mode;

receiving at least one reverse power control channel for the control channel and its affiliated data channel; and adjusting the forward transmit powers of the forward channels based on any distinct pilot sets of pilot codes by sending power control data over the at least one of the reverse power control channels.

17. The method according to claim 16 wherein the determination of whether the data channel is placed into the soft hand-off mode is based upon available channel capacity at base stations participating in the soft hand-off mode for the mobile station.

18. The method according to claim 16 wherein the determination whether a data channel is placed into the soft hand-off mode is based upon an interference reduction goal of using a lesser number base stations for the forward data channel than a simulcasted control channel participating in the soft hand-off mode.

19. The method according to claim 16 further comprising the step of:

opting the data channel out of the soft hand-off mode and reestablishing the data channel after the soft hand-off mode terminates for the mobile station.

20. The method according to claim 16 further comprising the step of:

re-establishing the data channel when an active set size equals one after the soft hand-off mode of the mobile station.

21. The method according to claim 16 wherein the determining step comprises providing the new pilot channel to service the control channel based on measured signal parameters of a neighbor set at the mobile station.

22. A communications system for controlling downlink transmit power, the communications system comprising:

a switching center for determining if a forward control channel serving a mobile station, the forward control channel being affiliated with a forward data channel of the mobile station, is participating in a soft hand-off;

a receiver of a base station for receiving at least one reverse power control channel based on a total number of distinct pilot sets of pilot codes associated with said forward channels;

a downlink power controller of the base station for adjusting the forward transmit powers of any of the distinct pilot sets of pilot codes independently by sending power control data over the at least one of the power control channels to compensate for fading of the forward channels.

23. The system according to claim 22 further comprising:

a receiver of the base station for receiving data relating to multiple inner-loop power control schemes to control the forward transmit power of the base station participating in the soft hand-off of the mobile station.

24. The system according to claim 22 wherein the downlink power controller is adapted to adjust the forward transmit powers of the base station on an active set-by-active set basis for each of the pilot sets.

25. A wireless communications system for controlling downlink transmit power comprising:

a switching center for determining whether a forward data channel serving a mobile station is to be placed into a soft hand-off mode upon placement of a forward control channel in a soft hand-off mode, the forward control channel being a forward control channel of the mobile station and being affiliated with the forward data channel;

a receiver for receiving at least one reverse power control channel for the control channel and its affiliated data channel; and a power controller of a base station for adjusting the forward transmit powers of the forward channels based on distinct pilot sets of pilot codes by receiving power control data over the at least one of the reverse power control channel to compensate for fading of the forward channels.

26. The system according to claim 25 wherein the switching center is adapted to determine whether the data channel is placed into the soft hand-off mode based upon available channel capacity at base stations participating in the soft hand-off mode for the mobile station.

27. The system according to claim 25 wherein the switching center adapted to determine whether a data channel is placed into the soft hand-off mode is based upon an interference reduction goal of using a lesser number base stations for the forward data channel than for a simulcasted forward control channel participating in the soft hand-off mode.

28. The system according to claim 25 further comprising:

memory associated with the switching center for storing packet data messages associated with opting the data channel out of the soft hand-off mode and reestablishing the data channel after the soft hand-off mode terminates for the mobile station.

29. The system according to claim 25 wherein the switching center determines whether to add a new pilot channel to service the control channel and engage in the soft hand-off mode based on measured signal parameters of a neighbor set at the mobile station.

30. A mobile station for controlling downlink transmit power during a soft hand-off:

a measurer for determining at least one relatively strong pilot channel for a forward data channel and a forward control channel during a soft hand-off;

a processor for establishing multiple power control channels based on a total number of distinct pilot sets of pilot codes associated with the forward channels;

a transceiver for sending power control data over the established multiple power control channels to compensate for fading of the downlink signal.

31. The mobile station according to claim 30 wherein the distinct pilot sets include a control pilot set for the forward control channel and a data pilot set for the forward data channel, wherein the control pilot set and the data pilot set each contain a different number of pseudo-random noise code offsets.

32. The mobile station according to claim 30 wherein the distinct pilot sets include a control pilot set for the forward control channel and a data pilot set for the forward data channel, wherein the control pilot set and the data pilot set each contain a different identity of pseudo-random noise code offsets.

* * * * *